Dec. 24, 1968   F. R. KULL   3,417,427
INDEXING AND DISPENSING MECHANISM
Filed Dec. 16, 1966   2 Sheets-Sheet 1

INVENTOR.
FRANCIS R. KULL
BY
Symestvedt & Lechner
ATTORNEYS

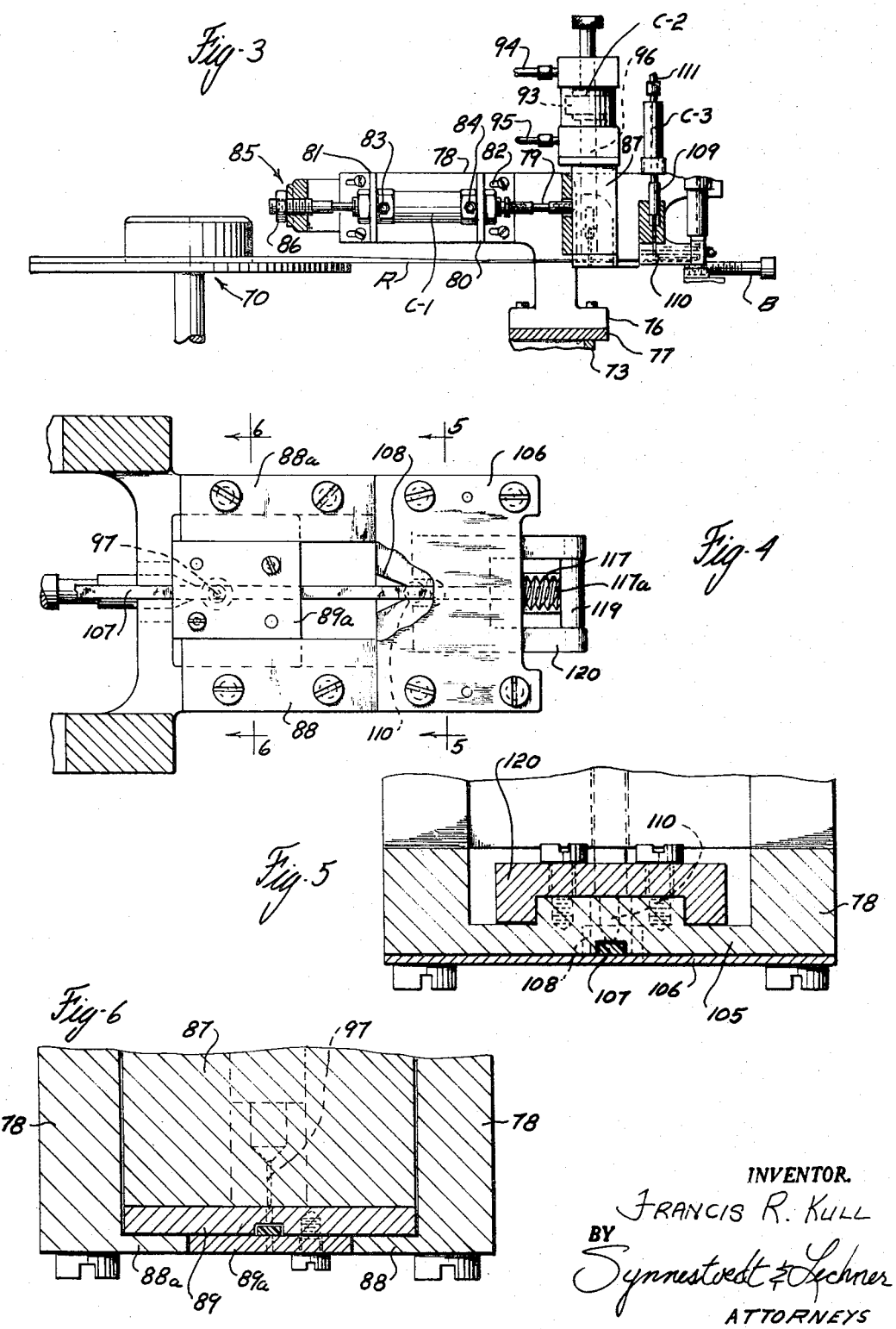

United States Patent Office 3,417,427
Patented Dec. 24, 1968

3,417,427
INDEXING AND DISPENSING MECHANISM
Francis R. Kull, Warminster, Pa., assignor to Standard Pressed Steel Co., Jenkintown, Pa., a corporation of Pennsylvania
Filed Dec. 16, 1966, Ser. No. 602,387
7 Claims. (Cl. 18—1)

This invention relates to apparatus for indexing and dispensing materials and more particularly to apparatus for precisely indexing a ribbon of material to a position in which it can be applied to a workpiece.

The apparatus is especially well suited for the indexing, cutting and subsequent application of discrete lengths of plastic material to a localized area of a workpiece.

An important application of apparatus of the invention is the bonding of plastic locking elements to a surface of the internal or external threads of a threaded fastener, such as a bolt or a nut, and the invention will be primarily illustrated by reference to the manufacture of self-locking bolts having such plastic locking elements bonded thereto.

The present invention is applicable to the production of thread locks of the type contemplated in the United States Patent to Joseph P. Villo (No. 3,093,177), although certain important aspects of the invention have utility in connection with the application of other types of thread locks, for example, those characterized by the insertion of a plastic plug into a hole or groove drilled or machined into the body of a threaded device.

In the formation of thread locks of the general type referred to hereinabove, it is important that the length of the material supplied is controlled within very close limits, as well as its axial position on the shank of the fastener. Variations in length of the material will result in variations in the amount of torque required to loosen or tighten the fastener. Moveover, when the piece of plastic material is bonded to the surface of a workpiece by means of a movable, heated die which presses the material into engagement with the surface of the workpiece, the die must exert a substantially uniform pressure over the entire surface of the plastic material. If the plastic material is longer than the surface of the die or is improperly positioned with respect thereto, it will not properly bond. The presence of unbonded portions may result in the entire piece of plastic being stripped off when the fastener is torqued into a threaded hole. If the plastic is a laminate of the type in which the bonding layer is sensitive to moisture, the presence of such moisture may result in eventual loss of bond between the laminate and the part during storage of the parts.

Accordingly, an important object of the invention is the provision of apparatus for accurately positioning discrete lengths of material relative to a tool or a workpiece to which the material is to be secured.

Still another object of the invention is the provision of indexing and dispensing apparatus which is simple and reliable in design.

The foregoing and other objects are achieved by means including a transfer block movable in a reciprocatory path for advancing the ribbon of material during the forward portion of the movement. A ribbon guide structure within the block defines a channel through which the ribbon is adapted to extend. A bore in the block intersects the channel and a pin is mounted for movement in said bore axially thereof into a position in which it intersects the channel and pierces the ribbon therein. Drive means are provided for advancing the transfer block, the piercing pin and the ribbon. A second ribbon guide is provided at a fixed distance relative to said first ribbon guide and means are provided for clamping the ribbon within said guide following indexing movement by said piercing pin. Shearing mechanism is provided in order to shear off a discrete length of ribbon as it projects from the exit end of the second guide.

The various objects of the invention will become fully apparent upon reference to the following detailed description of an illustrative embodiment of the invention when taken in conjunction with the accompanying drawings in which:

FIGURE 3 is an elevational view on a reduced scale of the structure shown in FIGURES 1 and 2;

FIGURE 4 is a plan view of the indexing mechanism of FIGURES 1 and 2, looking upwardly from beneath the structure as it is shown in FIGURE 2;

FIGURE 5 is a fragmentary sectional view taken along line 5—5 of FIGURE 4; and

FIGURE 6 is a fragmentary sectional view taken along line 6—6 of FIGURE 4.

Figures 1, 2:
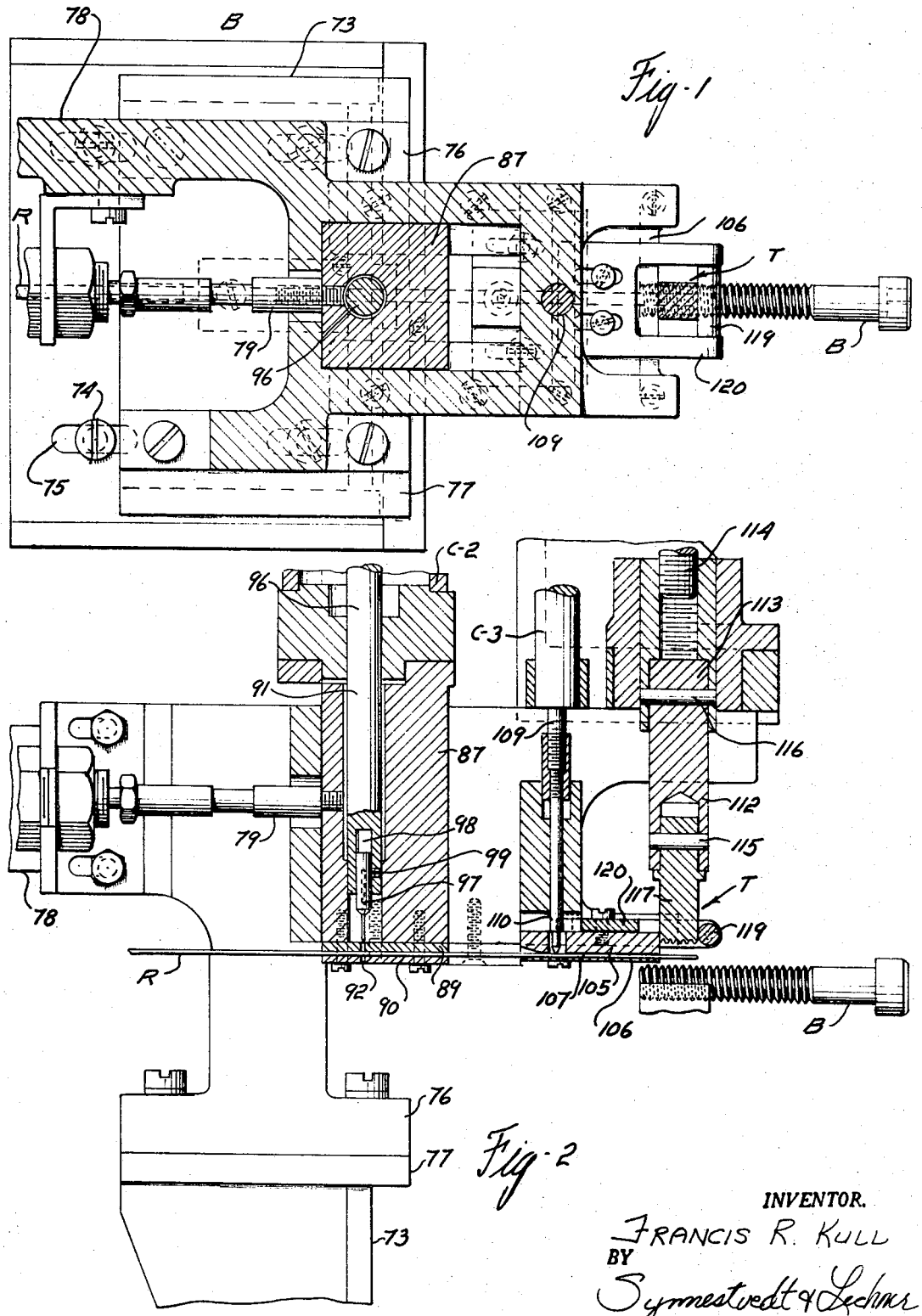
FIGURE 1 is a plan view partly in section of the indexing mechanism of the present invention.
FIGURE 2 is an elevational view partly in section of the structure shown in FIGURE 1.

As noted above, the invention involves the provision of mechanism which is especially useful for advancing or indexing a predetermined length of a material such as a thermoplastic ribbon into a position in which it is accurately aligned with the threads of a bolt or other workpiece so that it can thereafter be sheared off by a tool and pressed into intimate contact with a desired portion of the work-piece surface. Typically, the piece of material is bonded to the surface by means of heat and by pressure.

Turning first to FIGURES 1–3, a ribbon of plastic material designated by the reference character R is shown extending from a storage reel 70 (FIGURE 3) to the indexing and feed mechanism. The latter is mounted on a support B, omitted from all but FIGURE 1 for clarity of illustration. Typical ribbons useful for applying locking elements to bolts and the like range in size from about 0.050 inch in width and 0.010 inch in thickness for number 4–40 thread screws to 0.160 inch in width and 0.030 inch in thickness for 1″ 8 thread screws—it being understood that these sizes are given for purposes of example only.

The mounting means for the feed or indexing mechanism includes a support 73, portion of which is shown in FIGURES 1 and 3 and which is bolted to the base B by means of bolts 74 which extend through elongated slots 75 and are threaded into threaded holes in the base.

A housing frame 76 (see FIGURES 1 through 3) is bolted to a pedestal 77 on top of the bracket 73. Frame 76 is provided with a leftwardly extending portion 78 (as illustrated in the drawings) on which a pressure cylinder C–1 is mounted. A piston, not shown, is slideably mounted for axial movement within the cylinder C–1 and drives a piston rod 79 in horizontal path between first and second limits of travel.

Cylinder C–1 is mounted on the extension 78 of frame 76 by a pair of angular brackets 80 and 81. The angular brackets are bolted to member 78 by bolts which pass through elongated slots 82. This arrangement provides for limited axial adjustment of the cylinder C–1 for reasons which will appear subsequently.

Pressure is delivered to the cylinder C–1 through air lines 83 and 84 which are selectively pressurized by suitable control means, so that fluid under pressure is delivered to one or the other side of the piston within the cylinder C–1, thereby driving the piston and piston rod 79 back and forth between its limits of travel at desired times during an operating cycle. A threaded stop 85 can be locked in adjusted axial position by means of a nut 86 in order to control the length of stroke of the piston rod 79.

As is perhaps best shown in FIGURES 1 and 2, piston rod 79 is provided with a threaded end portion by which it is secured to a block 87. Block 87 is guided within a rectangularly shaped opening in the right hand portion of bracket 76.

As shown in FIGURE 6, a pair of support plates 88 and 88a are bolted to the support bracket 76 beneath the transfer block 87. In use, the plates support the block during its movement back and forth within the rectangular opening in bracket 76.

A guide structure, including a plate 89 and a plate 90, is bolted to the bottom of the transfer block 87. The plate 89 is provided with a groove which is aligned with the direction of movement of the transfer block. The grooved plate 89 and the bottom plate 90 form a channel within which the ribbon of plastic material is guided. Preferably, the channel is just wide enough and thick enough to accommodate and guide the ribbon of material. A variety of plates 89 and 90, having different sized guide channels, may be provided in order to accommodate different sizes of ribbons.

Transfer block 87 is provided with a vertically extending bore 91, as that block is viewed in FIGURES 2 and 3. The axis of bore 91 intersects the channel formed by the members 89 and 90 and a portion of the bore 92, having a greatly reduced diameter with respect to the portion 91, passes through the guide member 89 and into guide member 90.

A pressure cylinder C-2 is mounted on top of and secured to the transfer block 87. A piston 93 is slideably mounted within the cylinder C-2. Lines 94 and 95 lead to the interior of the cylinder C-2 on opposite sides of the piston 93 and are selectively pressurized to drive the piston back and forth between its limits of travel. A piston rod 96 is connected to the piston 93 and extends downwardly into the bore 91. A pin 97 is fitted within a bore 98 in the end of the rod 96 and is held in place by means of a set screw 99.

In operation of the structure so far described, cylinder C-2 is pressurized to drive the pin 97 downwardly to the second position in which it pierces a ribbon of material within the channel. It should be observed that in the second or lowered position, the end of the pin is supported by the bore 92 in lower guide plate 90. With this arrangement, breakage of a pin, which might otherwise occur if resistance developed to the advance of the ribbon, is eliminated.

When the piercing pin is in the second position, cylinder C-1 is pressurized to drive the transfer block 87 to the right as viewed in FIGURES 1 through 3, thereby carrying the ribbon towards the right as it is viewed in those figures. The arrangement results in positive advance of the same amount of ribbon during each indexing cycle.

A second ribbon guide structure, including guide plates 105 and 106, is provided to the right of the transfer block 87 as the parts are oriented in FIGURES 1-4. Guide plates 105 and 106 form a channel 107 which is aligned with the channel formed by the transfer block guide structure. In FIGURES 4 and 5, it can be seen that the channel mouth is widened somewhat as shown at 108 to facilitate entry of the ribbon of material.

Pressure cylinder C-3 (FIGURES 2 and 3) is positioned directly over and in alignment with the channel 107. A piston (not shown) journalled within cylinder C-3 drives a piston rod 109 on the end of which is mounted a blunt pin 110.

A pressure line 111 leads from a suitable source of pressure to the interior of cylinder C-3. Upon pressurization of the line 111, the piston, the piston rod 109 and the pin 110 are forced downwardly, clamping the ribbon in place.

Pressurization of cylinder C-3 is timed to take place after the ribbon of material has been advanced. After this occurs, the clamping pin is forced downwardly into clamping position and so remains until after pin 97 is retracted and transfer block 87 is removed to its left hand position of travel as viewed in FIGURES 1 through 3.

As shown in the drawings, a tool T is mounted at the exit end of the channel 107 for movement transversely of the ribbon R. The tool T is adapted to shear off a discrete length of the plastic material and press it into intimate engagement with the surface of the threaded workpiece B.

For this purpose, the tool is mounted by means of a connecting member 112 in the socket 113 of a piston rod 114. Pins 115 and 116 hold the tool within the connecting member and the connecting member within a socket which is secured to the end of the piston rod.

The piston rod drives the tool in a vertical plane between a retracted position above the channel 107 and a position in contact with the surface of the workpiece B.

In order to shear off the discrete length of plastic material, the guide 106 and the surface 117 of the tool are machined so that when one is in closely spaced relationship to the other and the tool is moved downwardly, the length of material is sheared off.

In order to guide the tool and to maintain it in closely spaced relationship to the guides, a roller 119 is mounted on the end of a bifurcated bracket 120. Roller 119 is rotatably mounted and guides the tool end during its movement.

For the purpose of bringing the sheared off ribbon into intimate contact with the threads of a threaded workpiece, the tool face is provided with threads which are complementary to the shape of the workpiece threads. These threads are preferably notched as shown at 117 in FIGURE 4, thereby forming a groove within which the ribbon of material rides. This groove is dimensioned so that when the tool moves to its lower position with the threads on either side of the groove in contact with the workpiece face, the plastic material will be pressed into contact with the threads subtended by the groove.

In operation, the ribbon of plastic material on the reel 70 is first fed by the operator into the opening between the guides 89 and 90 and is manually advanced until it projects out beyond the exit end of the guide channel 107. Thereafter, the tool is advanced downwardly to shear off the portion projecting from the exit end. The apparatus is now ready to be operated automatically, assuming that a work-piece is properly positioned for the application of the plastic material.

At the beginning of automatic operation, line 94 is pressurized, moving piston 93 downwardly until pin 97 pierces the ribbon. Immediately thereafter, line 83 is pressurized and cylinder C-1 drives piston rod 79 and transfer block 87 to the right as viewed in FIGURE 2. The ribbon is carried forward by the piercing pin and projects outwardly from the exit end of the channel 107 by an amount equal to the length of the face of the tool T. Thereafter, cylinder C-3 is pressurized and clamping pin 110 moves into clamipng position. Tool T is moved downwardly and shears off the piece of the ribbon projecting beyond the exit end of the channel 107 and presses the ribbon into intimate engagement with the surface of the bolt. The piercing pin is disengaged from the ribbon pin; pressurization of line 95 then occurs so that piston 93 and the piercing pin are lifted up. Thereafter, while clamping pin 110 is still forced downwardly, line 84 is pressurized to drive the piston rod 79 and the transfer block 87 back to their initial positions. Thereafter, the clamping pin and the punch are moved upwardly and the cycle can be repeated.

Clamping pin 110 is considered to be an important feature of the invention in that it prevents movement of the ribbon which might otherwise occur when the shearing takes place or when the transfer block is returned to the initial position.

It is also important to be able to control the length of material sheared as well as the axial position of the material with respect to the workpiece B. The former adjustment is accomplished by the adjusting nut 86; the latter by the slotted mounting brackets 80 and 81 which support cylinder C-1 and by the slots 75 in the pedestalled support 73.

I claim:

1. In apparatus for indexing a ribbon of material and for subdividing said ribbon into discrete lengths, a ribbon transfer block movable in a reciprocatory path for advancing said ribbon during the forward portion of said movement, a ribbon guide secured to said block, said guide defining a channel through which said ribbon is adapted to extend, said channel extending in the direction of movement of said block, a bore in said block intersecting said channel, a pin mounted in said bore for movement axially thereof, pin drive means for moving said pin between a retracted position and a position within said channel whereby the ribbon within the channel is pierced, transfer block drive means operable subsequent to movement of said piercing pin for thereafter advancing said transfer block, a second ribbon guide fixedly mounted relative to said first guide, a channel in said second guide in axial alignment with said first channel, a bore in said second guide intersecting said second channel, a clamping member mounted for axial movement within said bore, clamping member drive means operable upon advance of said transfer block to drive said clamping member into said channel to thereafter hold said ribbon in advanced position, a tool at the exit end of said channel, said tool being mounted for relative movement with respect to said guide transversely of the channel, and cooperating shearing surfaces on said tool and on the second ribbon guide, said surfaces being positioned to shear a discrete length of ribbon upon movement of said tool transversely of said second channel.

2. Apparatus according to claim 1, wherein said tool is provided with a pressure surface for pressing said discrete length of material into intimate contact with a threaded surface of a workpiece, a support for positioning said workpiece with the surface of the workpiece in alignment with the pressure surface of the tool, said pressure surfaces having threads complementary to the threads of said surface.

3. Apparatus according to claim 1, wherein said transfer block bore extends into the opposite wall of said channel and wherein said pin is within the extended portion of the bore during the advance stroke of said transfer block.

4. Apparatus according to claim 2, further including means for adjusting the length of the path of travel of said transfer block.

5. Apparatus according to claim 4, further including means for adjusting said indexing means along the axis of a workpiece in said workpiece support whereby the place of application of a discrete length of material on a workpiece may be regulated.

6. In apparatus for indexing a ribbon of thermoplastic material, a transfer block mounted for movement between two limits of travel, a ribbon guide structure defining a channel through which the ribbon of material is adapted to extend, said block being provided with a bore intersecting said channel, said channel extending in the plane of movement of said block, a pin mounted for movement within said bore, means for moving said pin between a retracted position and a position in which a ribbon in said channel is punctured, a second ribbon guide structure mounted adjacent said second limit of travel of said transfer block, said second guide structure defining a second channel in axial alignment with said first guide structure and adapted to receive the ribbon advanced by said transfer block, a shear surface at the exit end of said second channel and a shearing tool having a surface in contact therewith, and means for moving said tool transversely of said channel whereby discrete lengths of said material are cut off.

7. Apparatus according to claim 6, further including means to support the end of said pin upon movement thereof to the ribbon puncturing position.

References Cited

UNITED STATES PATENTS

| 2,627,923 | 2/1953 | Duncan | 226—53 XR |
| 2,852,806 | 9/1958 | Erdelye | 18—17 |
| 3,160,340 | 12/1964 | Menkel | 226—53 |
| 3,203,041 | 8/1965 | Beuter et al. | 18—1 |

WILLIAM J. STEPHENSON, *Primary Examiner.*

U.S. Cl. X.R.

226—53